(12) United States Patent
Mansoor et al.

(10) Patent No.: US 6,460,909 B2
(45) Date of Patent: Oct. 8, 2002

(54) BUMPER SYSTEM FOR MOTOR VEHICLES

(75) Inventors: Dhafer Mansoor, West Bloomfield, MI (US); Jeffrey Leonard Bladow, West Bloomfield, MI (US); Peter John Schuster, Dearborn, MI (US); Shui-Fang Chou, Troy, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/732,281

(22) Filed: Dec. 7, 2000

(65) Prior Publication Data

US 2001/0030432 A1 Oct. 18, 2001

Related U.S. Application Data

(60) Provisional application No. 60/170,935, filed on Dec. 15, 1999.

(51) Int. Cl.[7] ................................................ B60R 19/02
(52) U.S. Cl. ........................................ 293/120; 293/112
(58) Field of Search ................................ 293/112, 118, 293/119, 15, 38, 102, 120

(56) References Cited

U.S. PATENT DOCUMENTS

| | | | |
|---|---|---|---|
| 1,581,432 A | | 2/1926 | Fageol |
| 1,581,041 A | * | 4/1926 | Barros |
| 1,935,447 A | | 11/1933 | Hoffman |
| 3,739,882 A | | 6/1973 | Schweak et al. |
| 3,897,095 A | | 7/1975 | Glance et al. |
| 3,905,630 A | | 9/1975 | Cantrell |
| 3,912,295 A | | 10/1975 | Eggert, Jr. |
| 4,076,295 A | * | 2/1978 | Gutman |
| 4,098,531 A | * | 7/1978 | Renner et al. |
| 4,200,318 A | | 4/1980 | Gute et al. |
| 4,288,121 A | * | 9/1981 | Wiechert |
| 4,328,986 A | | 5/1982 | Weller et al. |
| 4,348,042 A | | 9/1982 | Scrivo |
| 4,457,547 A | | 7/1984 | Sekiiyama et al. |
| 4,465,312 A | | 8/1984 | Werner |
| 4,597,601 A | | 7/1986 | Manning |
| 4,830,686 A | | 5/1989 | Hashiguchi et al. |
| 4,877,266 A | * | 10/1989 | Lamparter et al. ...... 293/118 X |
| 4,951,994 A | * | 8/1990 | Miwa ..................... 293/118 X |
| 5,005,887 A | | 4/1991 | Kelman |
| 5,056,840 A | | 10/1991 | Eipper et al. |
| 5,078,439 A | | 1/1992 | Terada et al. |
| 5,080,411 A | | 1/1992 | Stewart et al. |
| 5,380,411 A | | 1/1992 | Stewart et al. |
| 5,154,462 A | | 10/1992 | Carpenter |
| 5,201,912 A | | 4/1993 | Terada et al. |
| 5,290,078 A | | 3/1994 | Bayer et al. |
| 5,393,111 A | | 2/1995 | Eippet et al. |
| 5,632,518 A | * | 5/1997 | Kendall .................. 293/118 X |
| 5,673,953 A | * | 10/1997 | Spease ....................... 293/118 |
| 5,688,006 A | | 11/1997 | Bladow et al. |
| 5,722,708 A | | 3/1998 | Jonsson |
| 5,967,592 A | | 10/1999 | Freeman |
| 6,003,912 A | | 12/1999 | Schonhoff et al. |
| 6,089,628 A | | 7/2000 | Schuster |
| 6,089,629 A | * | 7/2000 | Hope et al. ............. 293/102 X |
| 6,176,529 B1 | * | 1/2001 | Kitzmiller et al. .......... 293/102 |
| 6,179,353 B1 | | 1/2001 | Heatherington et al. |
| 6,227,582 B1 | | 5/2001 | Ichien |

\* cited by examiner

*Primary Examiner*—Joseph D. Pape
(74) *Attorney, Agent, or Firm*—Raymond L. Coppiellie

(57) ABSTRACT

A bumper system for a motor vehicle includes an energy absorber and a bumper beam interconnecting the energy absorber and vehicle structure. The bumper system also includes a push bar disposed below and operatively connected to the bumper beam to deflect and rotate during an impact with an object by the bumper system.

12 Claims, 13 Drawing Sheets

BUMPER SYSTEM FOR MOTOR VEHICLES

CROSS-REFERENCE TO RELATED APPLICATION(S)

The present application claims the priority date of co-pending United States Provisional Patent Application Ser. No. 60/170,935, filed Dec. 15, 1999.

BACKGROUND OF THE INVENTION

1. Field of the Invention

The present invention relates generally to bumpers for motor vehicles and, more specifically, to a bumper system for a motor vehicle.

2. Description of the Related Art

It is known to provide a bumper system for a front end or rear end of a motor vehicle. For a front end of the motor vehicle, the bumper system typically includes a bumper beam extending transversely and secured to a forward end of a pair of front rails, which extend longitudinally and are spaced transversely. The bumper system also includes an energy absorber extending transversely and in front of the bumper beam. The bumper system may include a fascia disposed over and covering the energy absorber.

It is also known that the bumper system protects a body of the motor vehicle from low speed impact with an object through elastic or semi-plastic deformation of the energy absorber. It is further known that the bumper system is an absorber for high-speed impact with an object through major plastic deformation of the bumper beam.

It is further known that a bumper system may have a mechanical device which either lowers down or pushes forward during certain vehicle travel speed to contain the low push bar design within the vehicle approach angle requirement.

It is desirable to provide a bumper system with a lower leg push bar that uses rotation of the push bar instead of its longitudinal deformation to reduce the under side intrusion of lower leg into the vehicle. It is also desirable to prevent a pedestrian's lower leg from being over-ridden by the bumper during an impact. It is further desirable to provide a bumper system with a pedestrian friendly device on a motor vehicle attached to a bumper beam made of spring steel that stores and resists impact energies. Therefore, there is a need in the art to provide a bumper system for a motor vehicle that meets these desires.

SUMMARY OF THE INVENTION

Accordingly, the present invention is a bumper system for a motor vehicle. The bumper system includes an energy absorber and a bumper beam interconnecting the energy absorber and vehicle structure. The bumper system also includes a push bar disposed below and operatively connected to the bumper beam to deflect and rotate during an impact with an object by the bumper system.

One advantage of the present invention is that a new bumper system is provided for a motor vehicle. Another advantage of the present invention is that the bumper system includes a lower leg push bar to prevent a pedestrian's leg from being over-ridden by the bumper during an impact. Yet another advantage of the present invention is that the bumper system has a lower leg push bar that rotates downward in the occurrence of vehicle impact with a leg of a pedestrian. Still another advantage of the present invention is that the bumper system has a lower leg push bar that is capable of rotating up and down in the case of curb or speed bump contact. A further advantage of the present invention is that the bumper assembly includes a pedestrian friendly device attached to a bumper beam made of spring steel that stores internal energies rather than resist energies which may damage a pedestrian's leg during incidental vehicle impact.

Other features and advantages of the present invention will be readily appreciated, as the same becomes better understood, after reading the subsequent description when considered in connection with the accompanying drawings.

DESCRIPTION OF THE PREFERRED EMBODIMENT(S)

Figure 1:
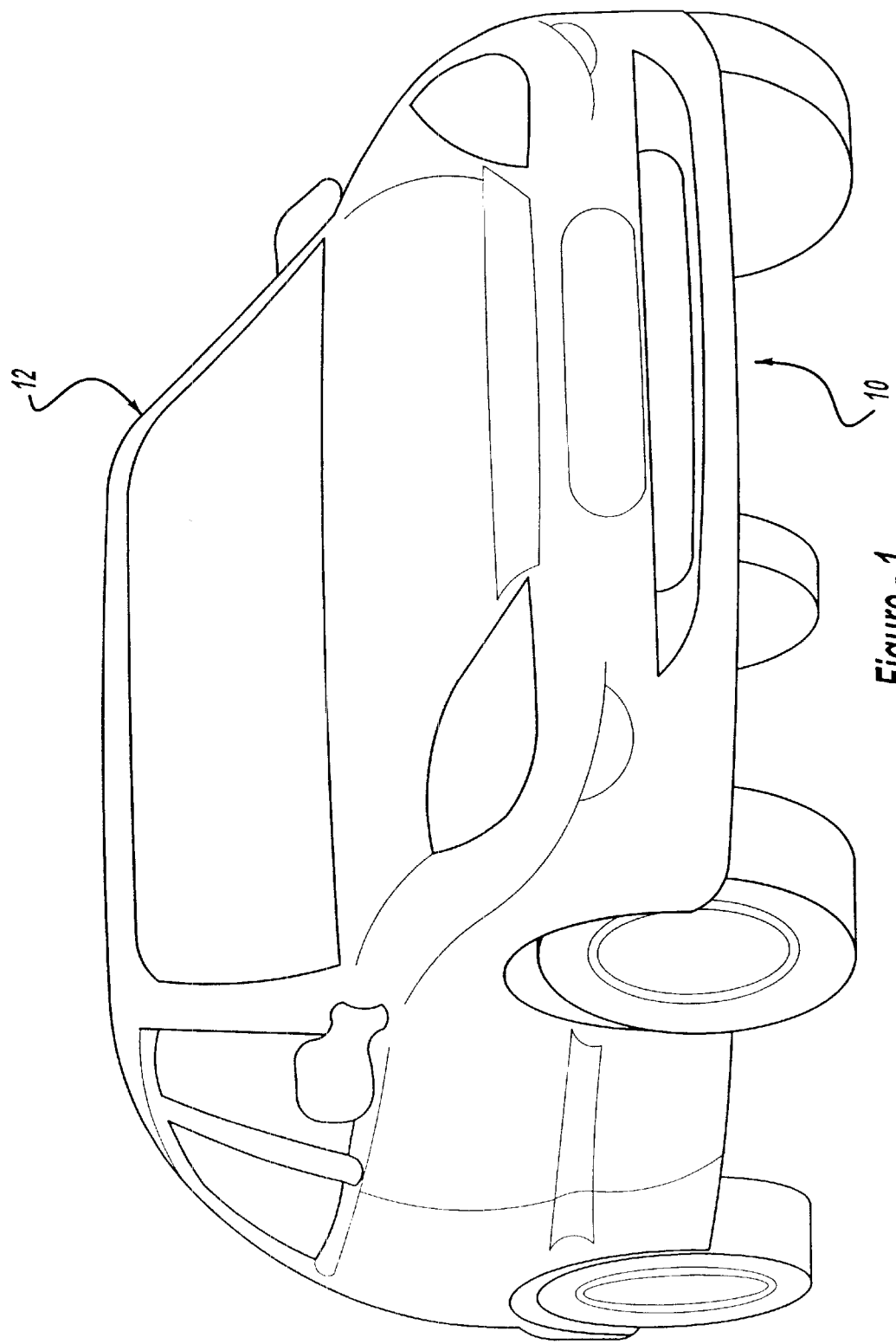
FIG. 1 is a perspective view of a bumper system, according to the present invention, illustrated in operational relationship with a motor vehicle.
Figure 2:
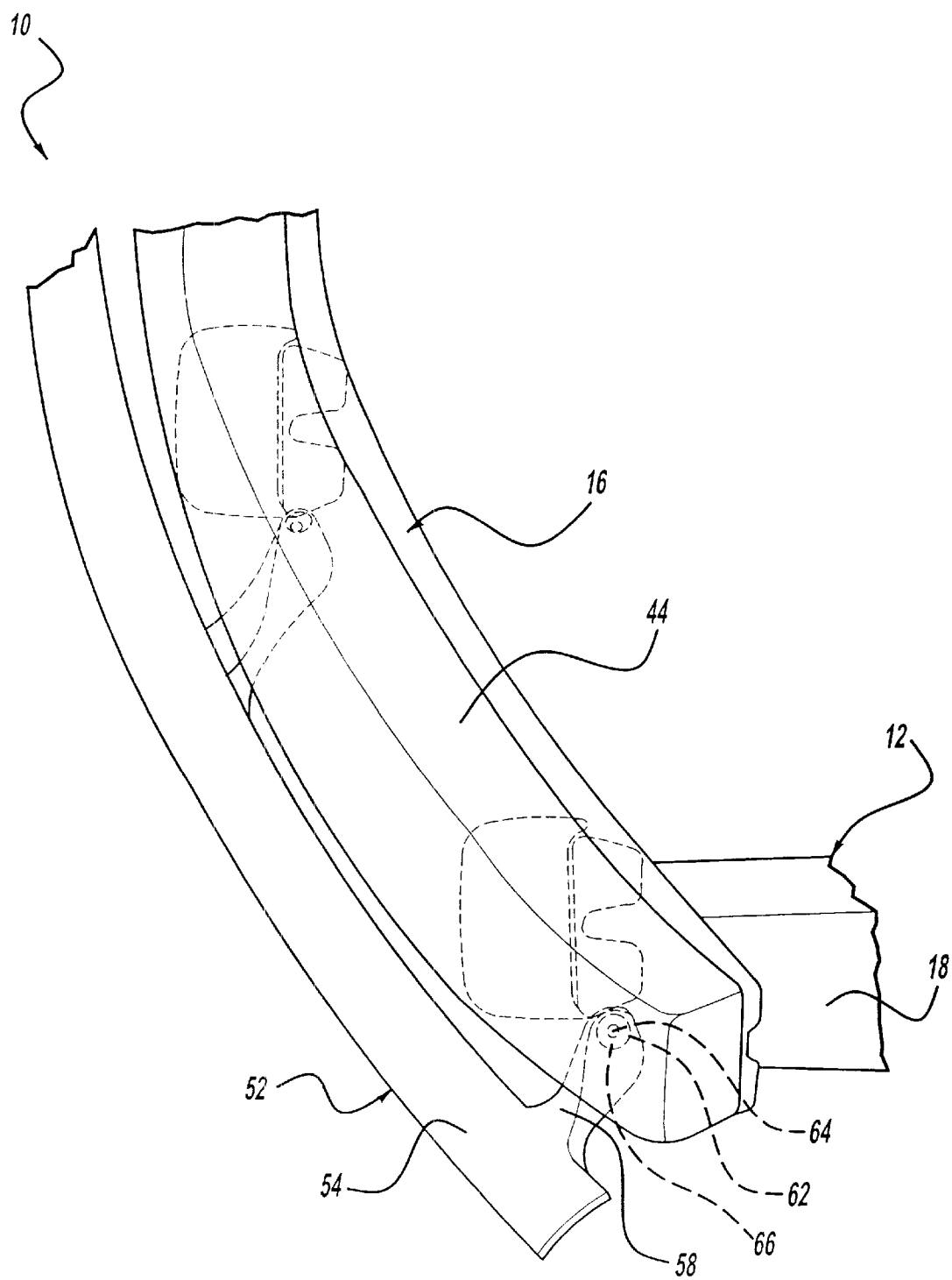
FIG. 2 is a partial perspective view of the bumper system of FIG. 1.
Figure 3:
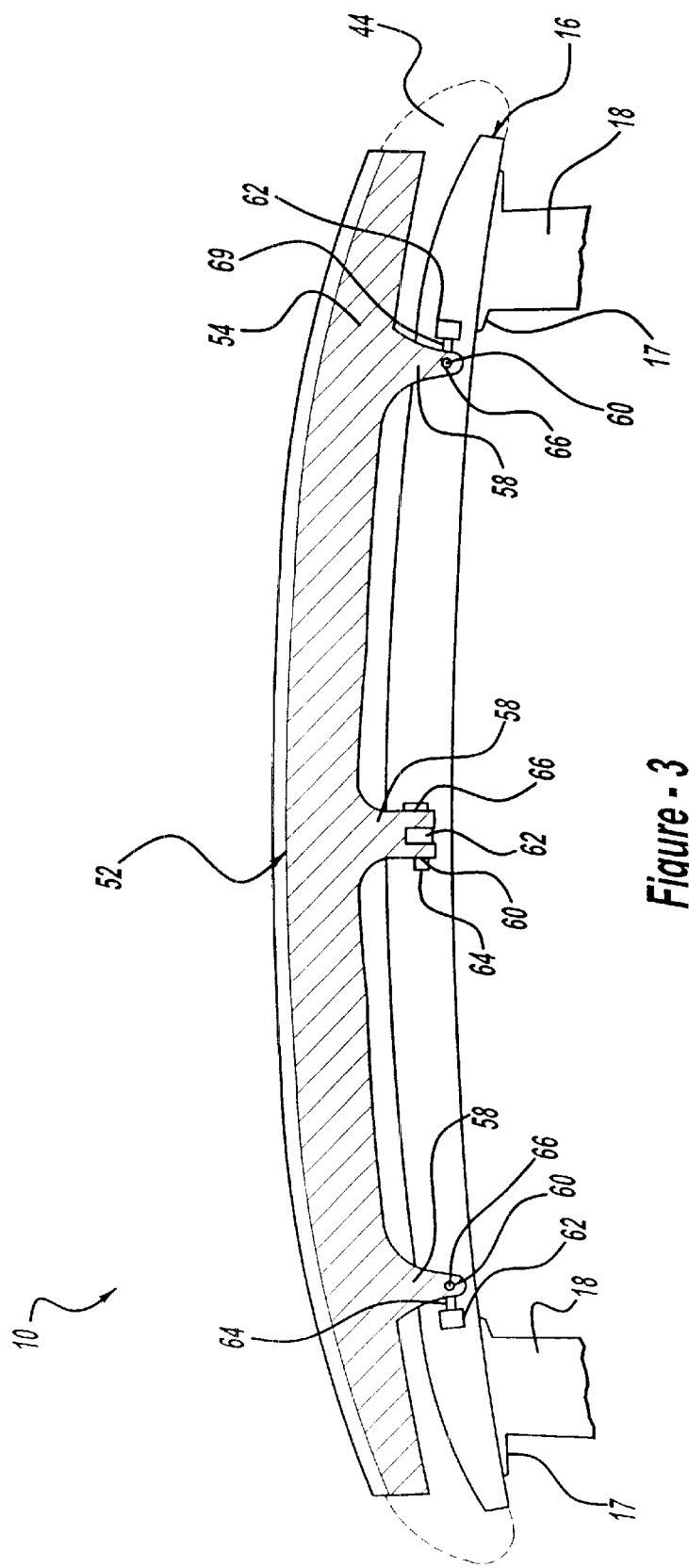
FIG. 3 is a fragmentary bottom view of the bumper system of FIG. 1.

Referring to the drawings and in particular FIG. 1, one embodiment of a bumper system 10, according to the present invention, is illustrated in operational relationship with a motor vehicle 12. The bumper system 10 is disposed at a front or forward end of the motor vehicle 12. It should be appreciated that the bumper system 10 may be disposed at a rear or rearward end of the motor vehicle 12. It should also be appreciated that, except for the bumper system 10, the motor vehicle 12 is conventional and known in the art.

As illustrated in FIGS. 2 through 5, the bumper system 10 includes a bumper beam, generally indicated at 16. The bumper beam 16 extends laterally and is secured to a forward end 17 of a pair of front rails 18 by suitable means such as welding or mechanical fastening. It should be appreciated that the bumper beam 16 may have any suitable cross-sectional shape.

In the embodiment illustrated, the bumper beam 16 is a hollow member having a general "B" cross-sectional shape. The bumper beam 16 has a front or impact wall 20 extending generally vertically and laterally. The bumper beam 16 also has an upper or top wall 22 and a lower or bottom wall 24 inclined from the impact wall 20 and extending laterally. The bumper beam 16 has a curved or arcuate forward corner wall 26 interconnecting the impact wall 20 and the upper and lower walls 22 and 24. The bumper beam 16 also has a rear or supporting wall 28 extending generally vertically and laterally from the upper and lower walls 22 and 24. The bumper beam 16 has a curved or arcuate rear corner wall 30 interconnecting the supporting wall 28 and the upper and lower walls 22 and 24. It should be appreciated that the impact wall 20 has a height greater than the supporting wall 28.

The bumper beam 16 also has a plurality of, preferably two generally horizontal interior walls 32 extending laterally and longitudinally forward toward the impact wall 20. The bumper beam 16 has a curved or arcuate inner corner wall 34 interconnecting the interior walls 32 and supporting wall 28. The bumper beam 16 has an inclined transition wall 36 extending laterally and longitudinally forward from the interior walls 32 and toward a center of the impact wall 20 and a curved or arcuate projection wall 38 interconnecting the ends of the transition walls 36. The impact wall 20 may be formed as two portions with each portion extending from the front corner walls 26 and spaced vertically from each other to form a gap (not shown) therebetween. The projection wall 38 is secured to the upper and lower portions of the impact wall 20 by suitable means such as welding or mechanical fastening to increase a stability of the bumper beam 16 against a "match boxing" behavior. The upper and lower portions of the impact wall 20 may have a plurality of apertures (not shown) extending therethrough and spaced laterally for a function to be described.

Figure 5:
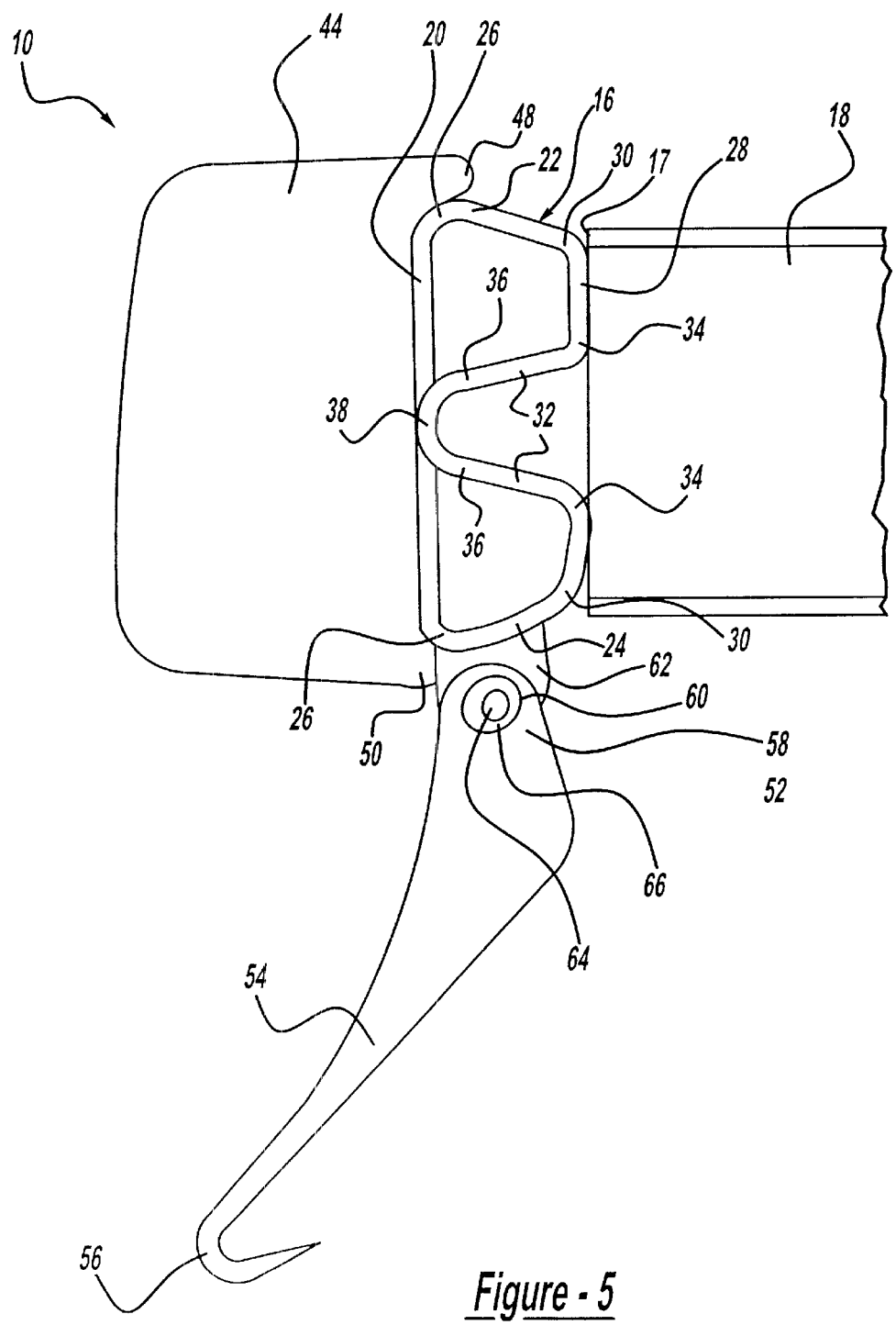
FIG. 5 is a side elevational view of the bumper system of FIG. 1 with a fascia removed.

As illustrated in FIG. 5, a top wall of the rail 18 is located between the upper wall 22 and the top interior wall 32 of the bumper beam 16 and a lower wall of the rail 18 is located between the lower wall 24 and the lower interior wall 32 of the bumper beam 16 in a symmetrical manner. As a result, the stiffness of the rail 18 causes the two interior walls 32 to collapse prior to the upper and lower walls 22 and 24 collapse. It should be appreciated that this overlapping collapse assures a uniform energy absorption characteristic in high-speed impacts. It should also be appreciated that the walls 22, 24, and 32 may have a plurality of apertures (not shown) extending therethrough to achieve a desired crush stiffness of the bumper beam 16.

The bumper beam 16 is made of a relatively rigid material such as metal. The bumper beam 16 is integral, unitary, and formed as one-piece by manufacturing processes such as roll forming which a conventional process known in the art. It should also be appreciated that other manufacturing processes such as extruding and stamping may be used to form the bumper beam 16. It should also be appreciated that the bumper beam 16 may be attached to a rearward end (not shown) of a pair of rear rails (not shown) of the motor vehicle 12 by suitable means such as welding.

The bumper system 10 includes an energy absorber 44. The energy absorber 44 extends laterally and is secured to the bumper beam 16. The energy absorber 44 may have a plurality of projections (not shown) extending rearward therefrom and through the apertures in the impact wall 20. The energy absorber 44 is a solid member having a generally trapezoidal shape with rear upper and lower lips 48 and 50 extending rearward. The upper and lower lips 48 and 50 have a generally arcuate or curved shape to extend over the front corner walls 26 of the bumper beam 16. The energy absorber 44 is made of a relatively deformable material such as foam. The bumper beam 16 may have a horizontal sweep to reduce the depth of the deformable material of the energy absorber 44. It should be appreciated that the apertures in the impact wall 20 allows the energy absorber 44 to have local penetration in order to avoid excess compacting of the deformable material during a high-speed impact with an object (not shown).

Figure 4:
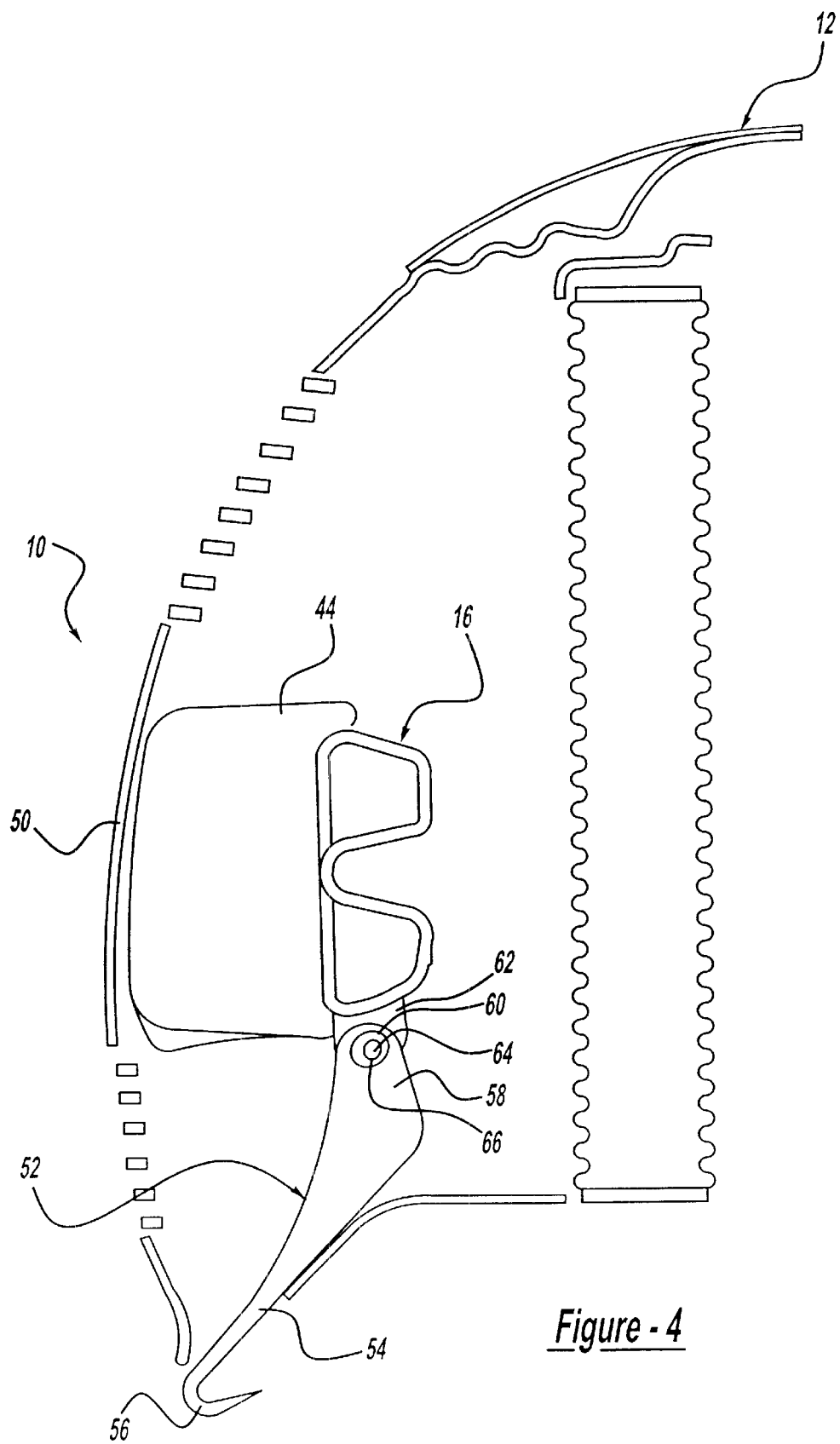
FIG. 4 is a fragmentary side elevational view of the bumper system of FIG. 1.

Referring to FIGS. 1 and 4, the bumper system 10 further includes a fascia 50 extending laterally and vertically to cover the energy absorber 44. The fascia 50 is secured to vehicle structure (not shown) by suitable means such as fasteners (not shown). The fascia 50 is made of a relatively rigid material such as plastic. It should be appreciated that the fascia 50 is conventional and known in the art.

Referring to FIGS. 2 through 5, the bumper system 10 includes a pedestrian lower leg push bar, generally indicated at 52, to limit a maximum lateral bending angle of a knee of a pedestrian 70 (FIGS. 7 and 8) who contacts the vehicle 12. As illustrated, the lower leg push bar 52 includes a push bar member 54 extending laterally across a front end of the vehicle 12 below or under the bumper beam 16 and energy absorber 44. The push bar member 54 is generally planar and rectangular in shape. The push bar member 54 may have an arcuate or generally "U" shaped portion 56 at a forward end thereof to contact the pedestrian. The push bar member 54 also includes at least one, preferably a plurality of attachment portions 58 extending at a rear end thereof and spaced laterally for attachment to either the bumper beam 16 or rails 18 in a manner to be described. The push bar member 54 is made of a relatively rigid material such as a composite or metal material. The push bar member 54 is a monolithic structure being integral, unitary, and one-piece. It should be appreciated that the push bar member 54 has a pre-designed horizontal downward angle.

The lower leg push bar 52 includes at least one, preferably a plurality of mechanical attachment devices 60 to attach the push bar member 54 to vehicle structure such as a lower face of the bumper beam 16 or the rails 18. The mechanical attachment devices 60 include a housing 62 attached to either the bumper beam 16 or rails 18 by suitable means such as welding. The mechanical attachment devices 60 also include a pin 64 extending through the attachment portions 58 of the push bar member 54 and the housing 62 to allow the push bar member 54 to rotate relative to the bumper beam 16 or rails 18. It should be appreciated that the mechanical attachment devices 60 are conventional and known in the art.

The lower leg push bar 52 includes at least one, preferably a plurality of springs 66 to urge the push bar member 54 toward a forward position and to control the stiffness of the lower leg push bar 52. The springs 66 are of a rotational type. One of the springs 66 is disposed in each of the housings 62 to cooperate with the pin 64. It should be appreciated that the springs 66 are conventional and known in the art.

Figure 6:
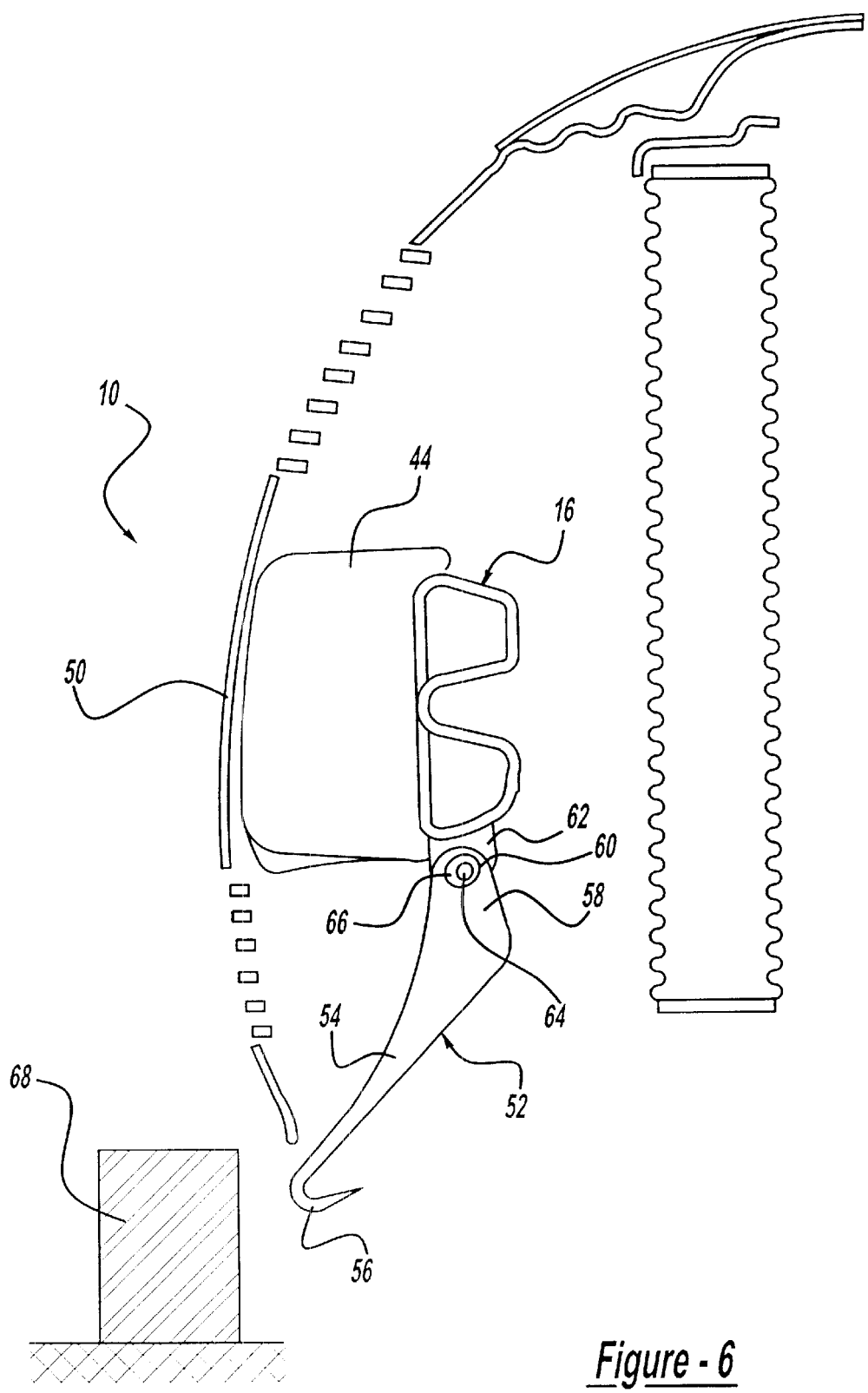
FIG. 6 is a fragmentary elevational view of the bumper system of FIG. 1 illustrating a first stage of a low-speed curb impact.
Figure 7:
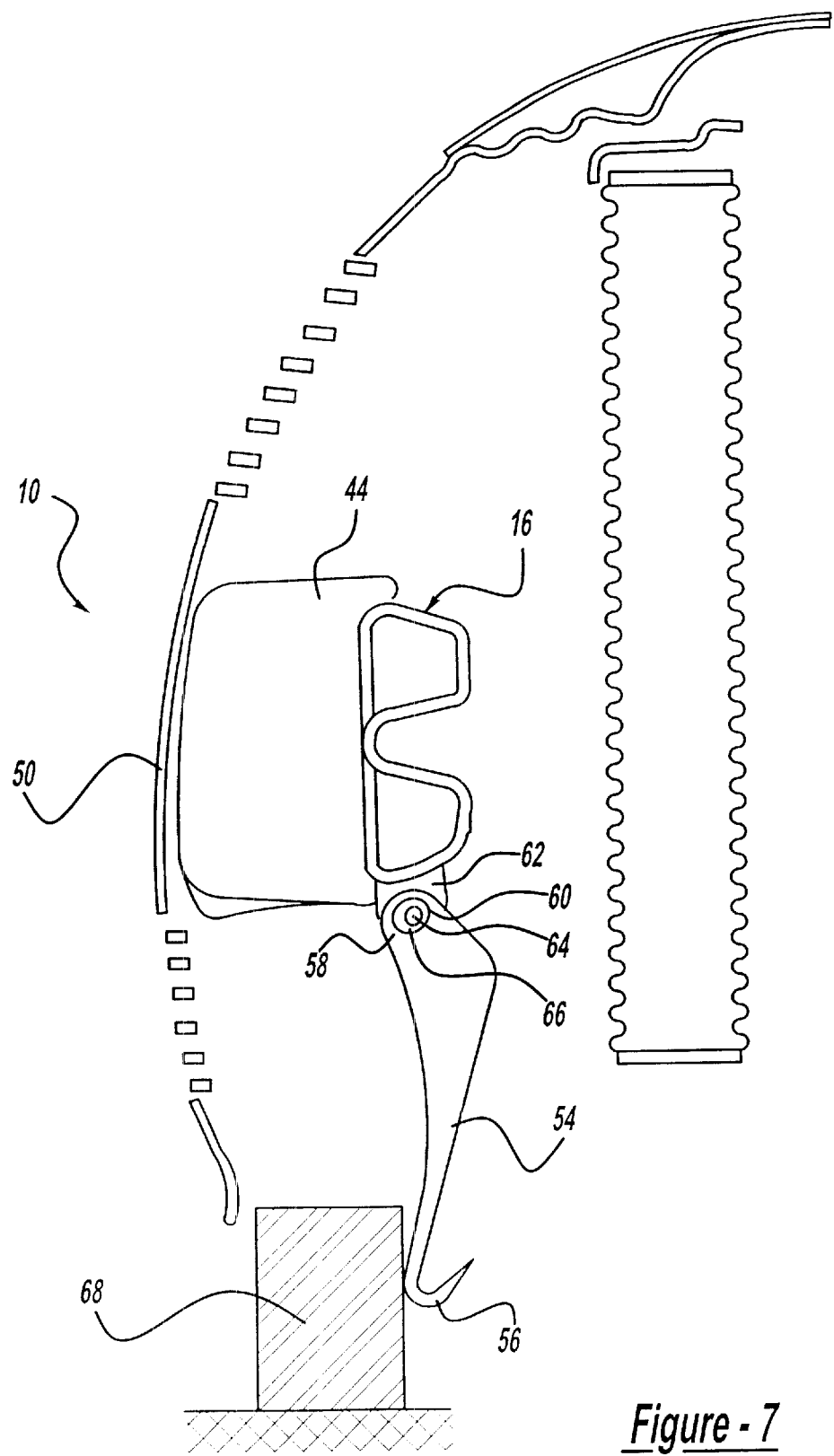
FIG. 7 is a view similar to FIG. 6 illustrating a second stage of a low-speed curb impact.

In operation, the bumper system 10 has a first stage or mode as illustrated in FIGS. 6 and 7. In the first mode at low speeds (i.e., less than or equal to approximately ten miles per hour), the bumper system 10 impacts an object such as a pothole or curb 68. In this case, the lower leg push bar 52 contacts the curb 68 and the impact force rotates the lower leg push bar 52 backward or counter-clockwise to yield to the incoming object. It should be appreciated that during a backup of the vehicle 12 from a steep driveway onto a relatively flat road surface, the front end of the vehicle 12 will have a mild "dive down" motion and the lower leg push bar 52 will be allowed to have clockwise rotation to avoid damage during this impact condition.

Figure 8:
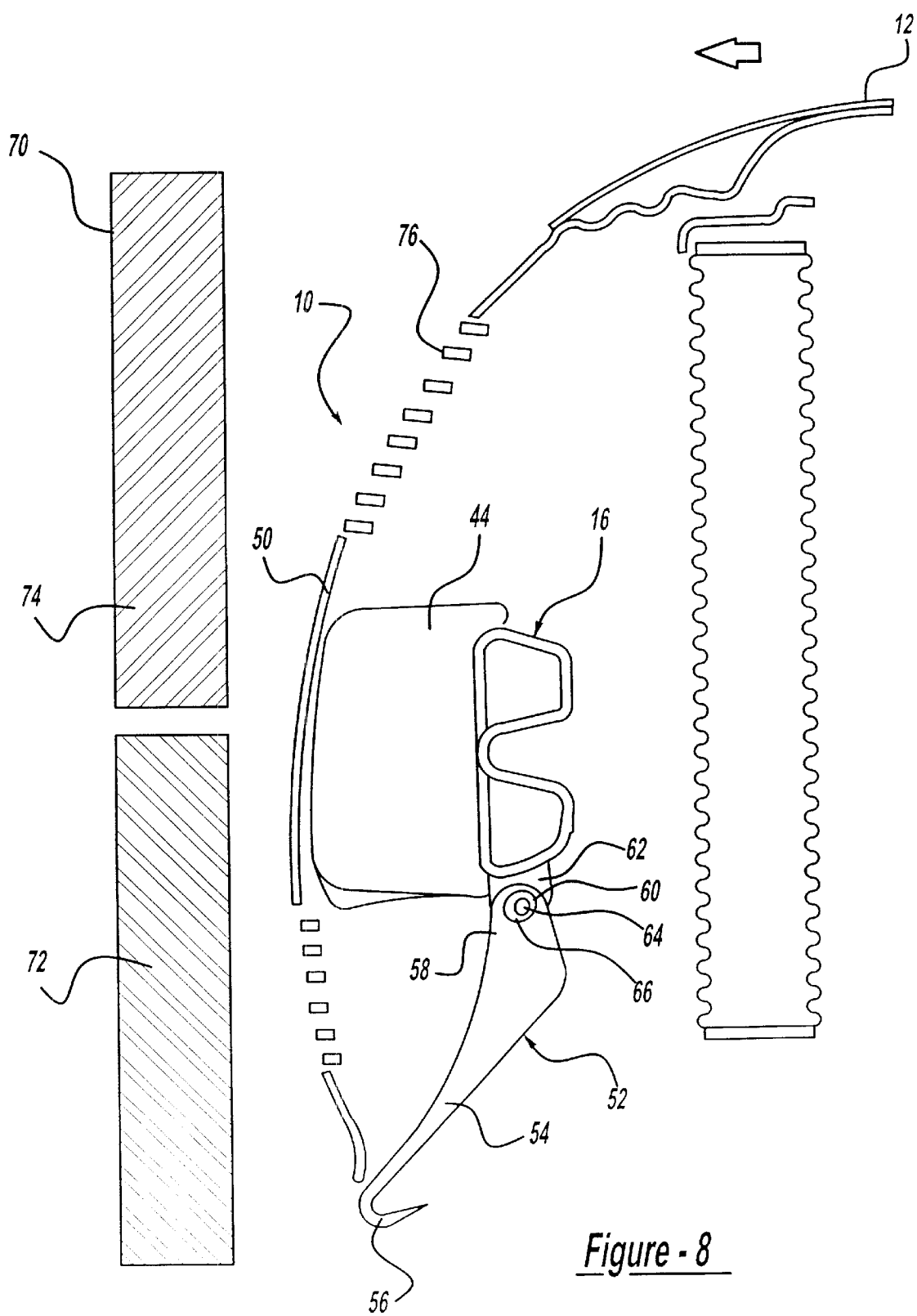
FIG. 8 is a view similar to FIG. 6 illustrating a first stage of a high-speed pedestrian impact.
Figure 9:
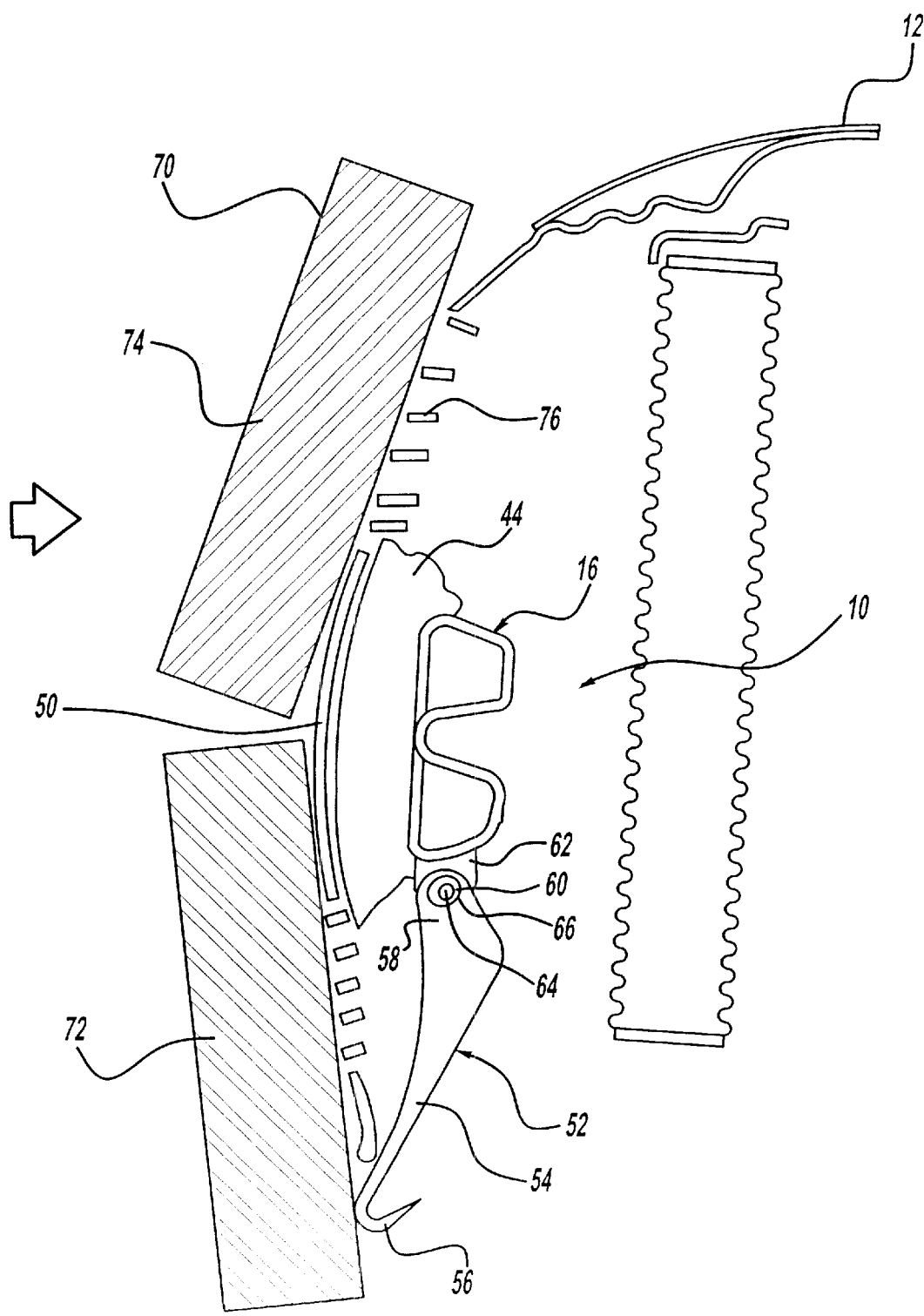
FIG. 9 is a view similar to FIG. 6 illustrating a second stage of a high-speed pedestrian impact.
Figure 10:
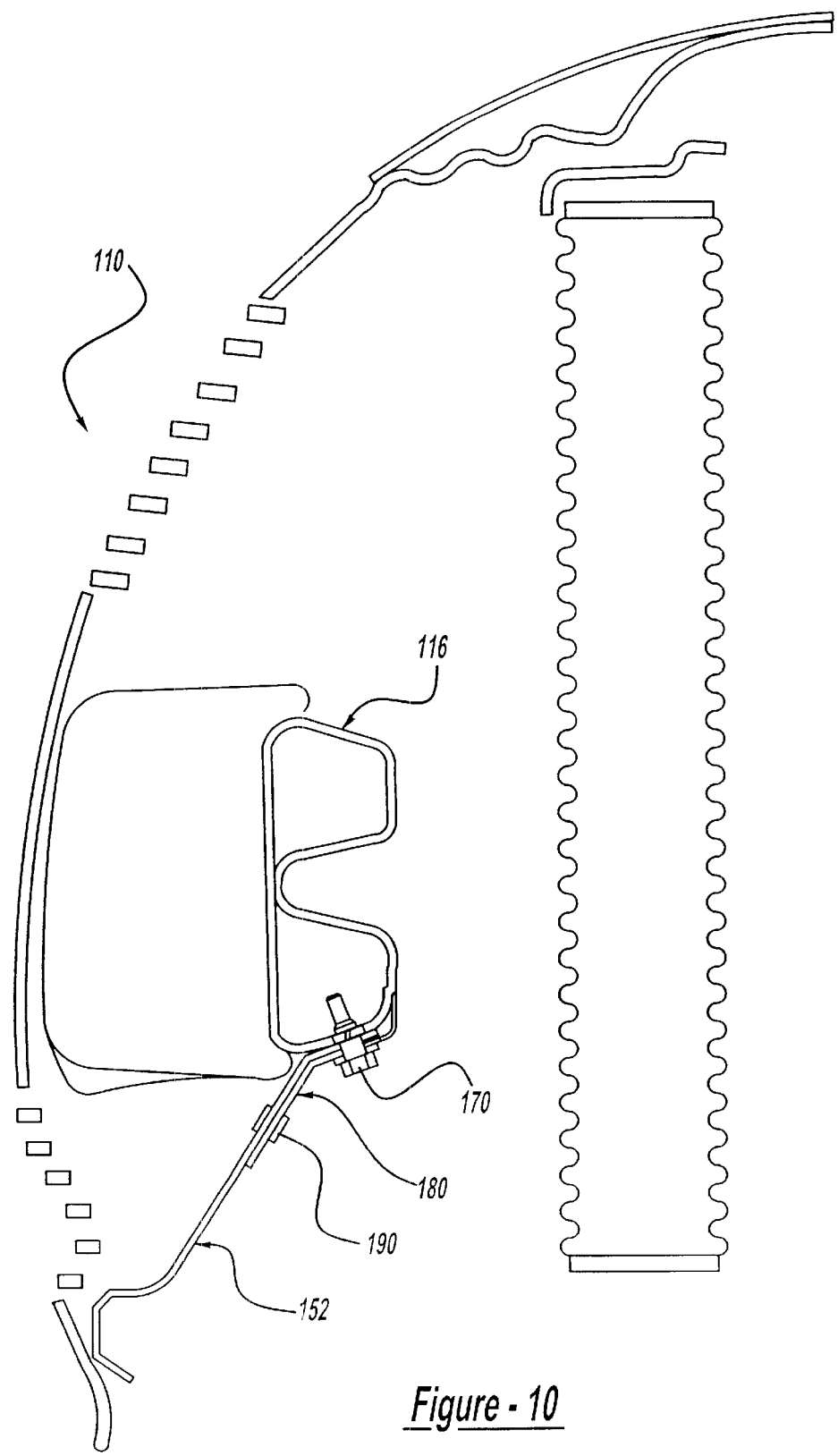
FIG. 10 is a fragmentary elevational view of another embodiment, according to the present invention, of the bumper system of FIG. 1.
Figure 11:
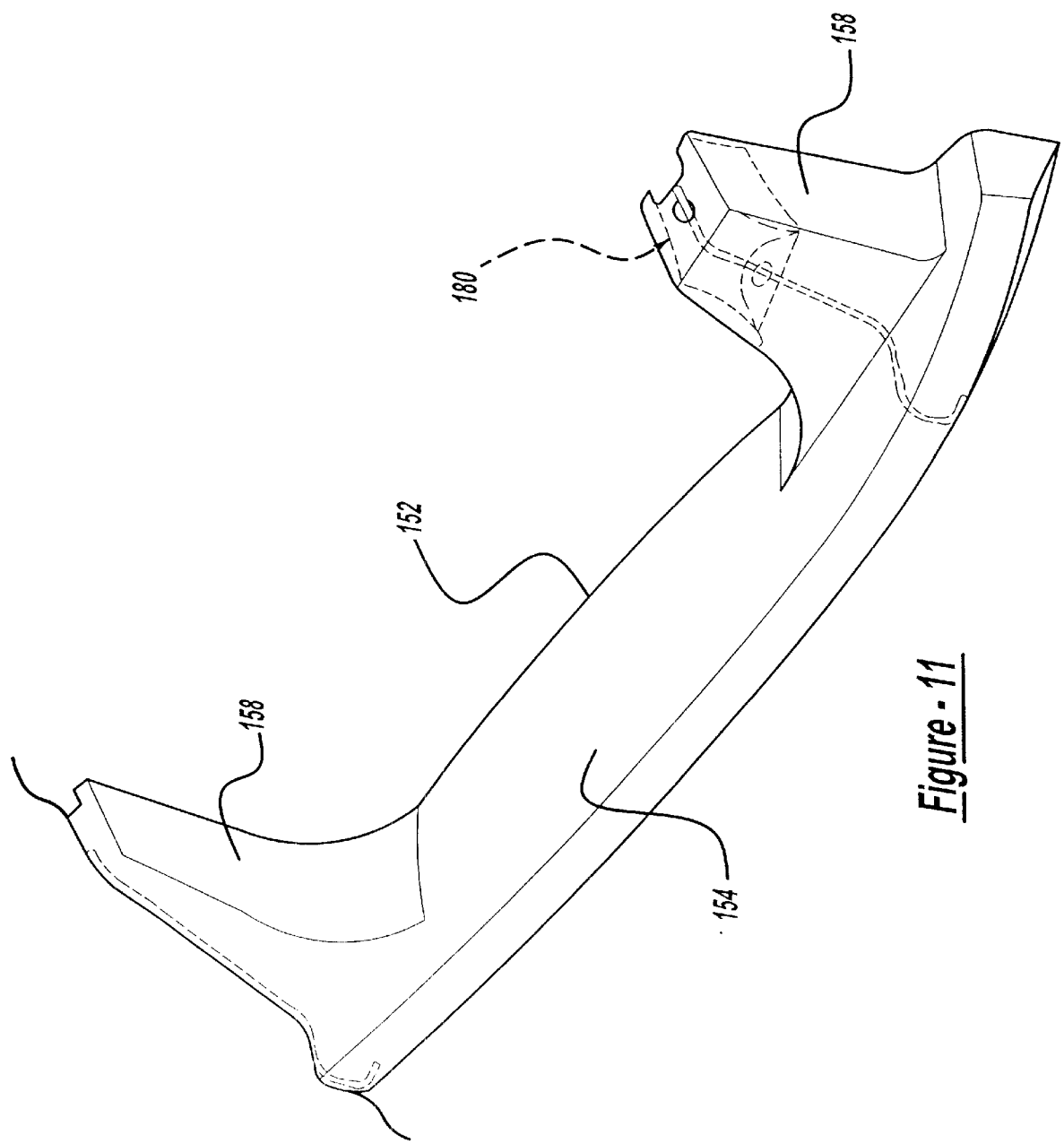
FIG. 11 is a perspective view of a portion of the bumper system of FIG. 10.
Figure 12:
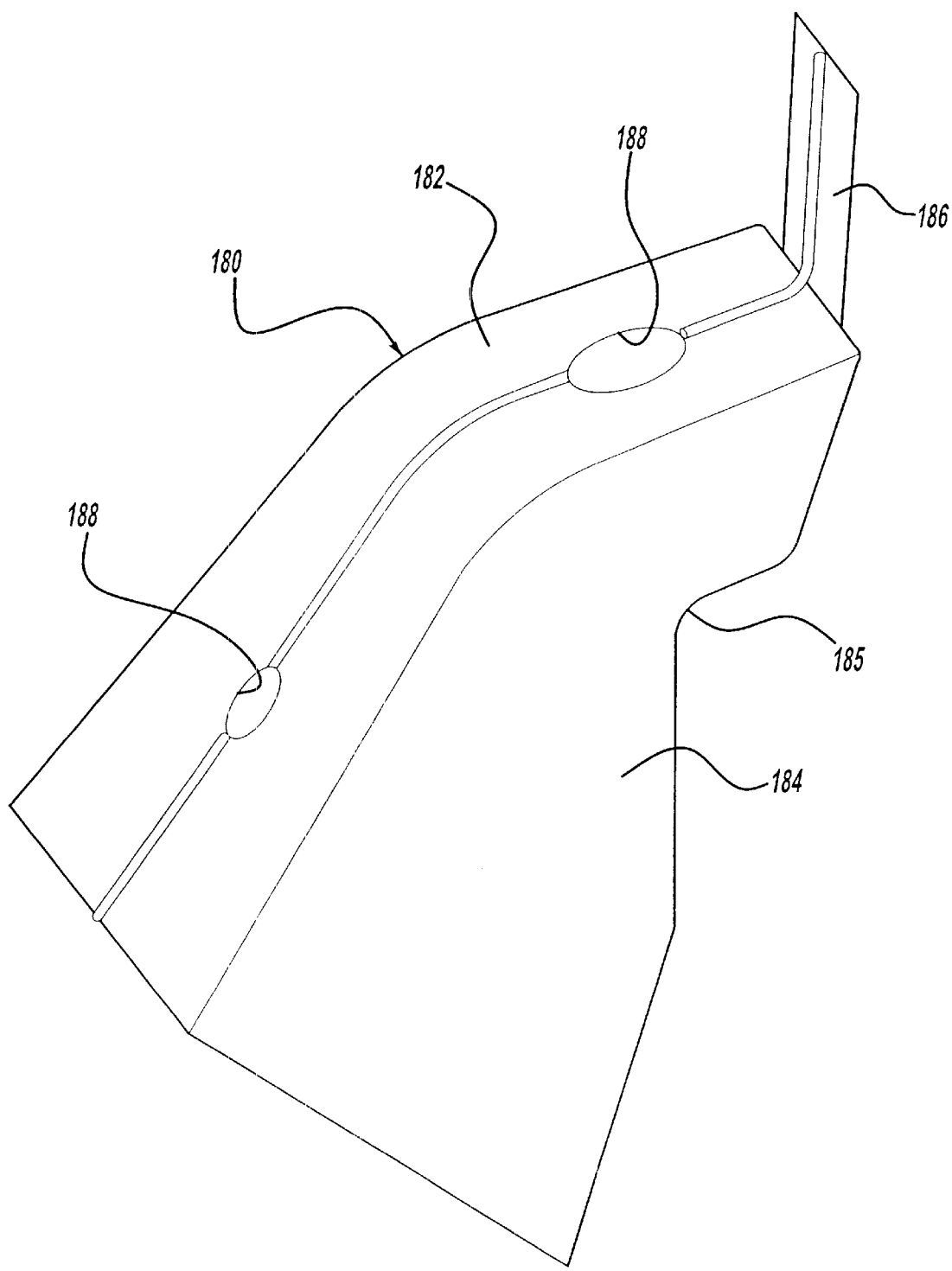
FIG. 12 is a perspective view of a portion of the bumper system of FIG. 10.
Figure 13:
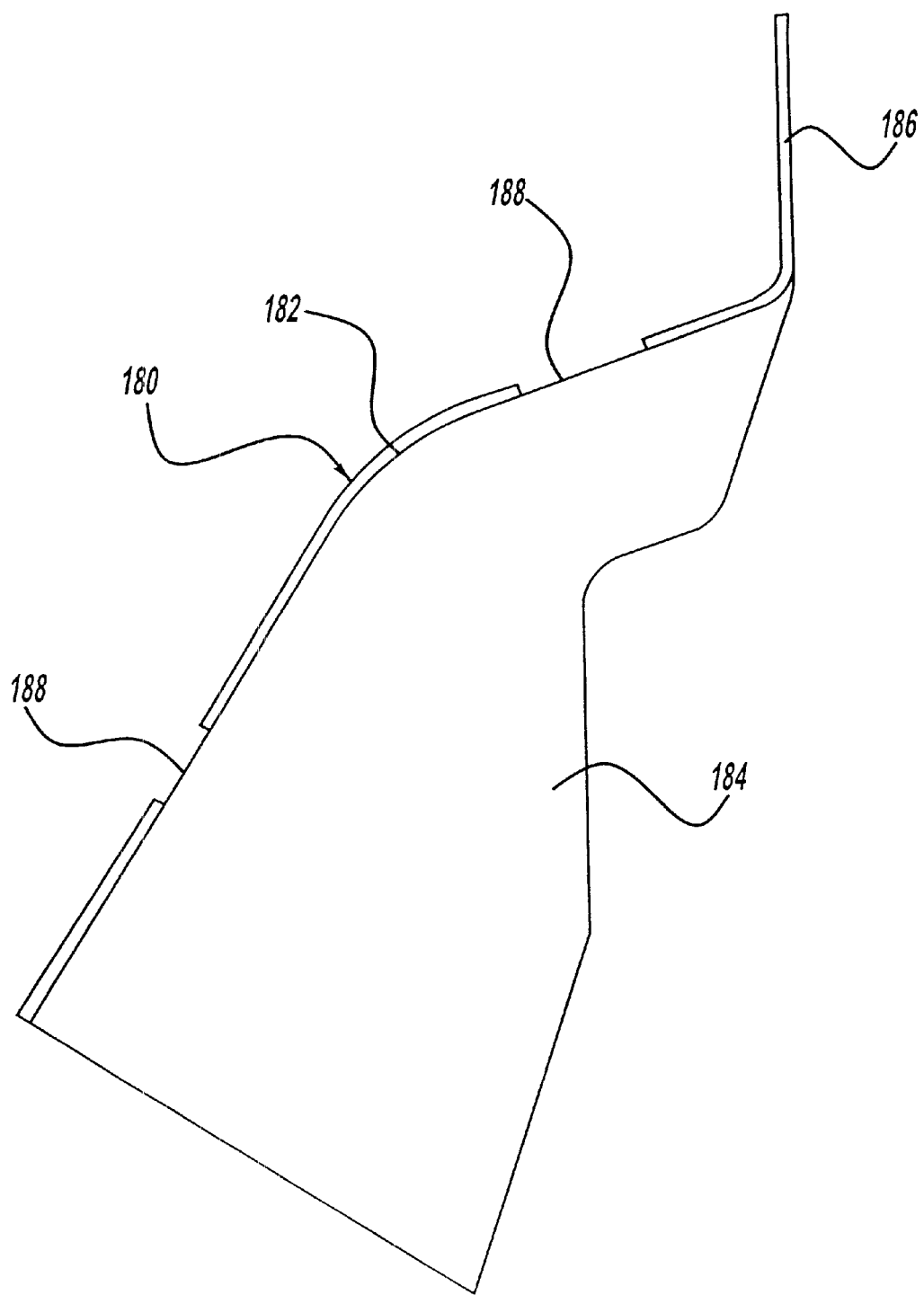
FIG. 13 is a side elevational view of a portion of the bumper system of FIG. 10.

Referring to FIGS. 8 and 9, the bumper system 10 has a second stage or mode as illustrated. In the second mode at high speeds (i.e., greater than approximately ten miles per hour), the bumper system 10 impacts an object such as a pedestrian 70. When a lower leg 72 of the pedestrian 70 contacts the lower leg push bar 52, this impact causes the push bar member 54 to deform and initiates a downward counter-clockwise movement. The force required to rotate the base member 54 will be controlled by the stiffness of the springs 66 located in the mechanical attachment devices 60. The deformation and the rotation of the push bar member 54 will absorb most of the impact energy on the lower leg 72. A knee joint of the pedestrian 70 will compress the energy absorber 44 to minimize the acceleration of the knee joint. The energy absorber 44 will cover the knee height in order to minimize the shear deformation of the knee joint. An upper leg 74 of the pedestrian 70 will impact the top of the bumper through either the fascia 50 or grille 76. The deformation of either the fascia 50 or grille 76 will minimize intrusion of the upper leg 74 to the exterior surface of the vehicle 12. After the leg has been accelerated to the vehicle's speed, the springs 66 will rotate the push bar member 54 back to its pre-impact position. It should be appreciated that the knee joint angle will be limited throughout the impact by the intrusion of the knee into the energy absorbing member 44, the lower leg 72 intrusion under the bumper beam 16 controlled by the push bar member 54, and the intrusion of the upper leg 74 into the fascia 50 or grill 76.

Referring to FIGS. 10 through 13, another embodiment 110, according to the present invention, of the bumper system 10 is shown. Like parts of the bumper system 10 have like reference numerals increased by one hundred (100). In this embodiment, the bumper system 110 includes a spring device, generally indicated at 180, attaching the lower leg push bar 152 to the bumper beam 116. The spring device 180 has a base wall 182 and side walls 184 extending generally perpendicular from the base wall 182 to form an inverted "U" shaped cross-section with a notch 185. The spring device 180 also has a reaction flange 186 extending generally perpendicular to the base wall 184. The spring device 180 includes at least one preferably a pair of apertures 188 extending through the base wall 182 to receive fasteners 190 for attaching the spring device 180 to the lower leg push bar 152 and bumper beam 116. The spring device 180 is made of a metal material such as spring steel, preferably a high strength steel that is above 50 ksi. The spring device 180 is made by a stamping process in which the side walls 184 have cuts for the notch 185 stamped therein and the spring device 180 is folded into shape with the flanges of the cuts mechanically joined by spot welding or fasteners (not shown) to form the notch 185. It should be appreciated that the adjoined flanges will bulk out of plane in order to be compatible with the deflection and to achieve a constant spring rate throughout the yielding of the flanges.

In operation, upon impact with a lower leg of a pedestrian, the push bar member 154 of the lower leg push bar 152 begins to rotate and applies a reaction force to the lower leg of the pedestrian. During this build up of forces, the spring device 180 reacts with a controlled resistive force storing energy applied by the leg of the pedestrian. The spring device 180 then applies a rebound force to the push bar member 154 and leg controlling the angularity of the pedestrian leg at the knee joint below a predetermined level. It should be appreciated that the spring device 180 allows the lower point of the push bar member 154 to be positioned farther aft in the vehicle 12 than a non-spring supported push bar member 154, which is beneficial to vehicle packaging and styling flexibility during new vehicle definition.

Accordingly, the spring device 180 provides attachment and joint strength for fastening a lower leg push bar 152 to a bumper beam 116 or other armature positioned at the front of the vehicle 12. The spring device 180 also provides strength and reaction forces to the push bar member 154 to resist breakage during incidental contact with any object in the external environment such as curbs, driveways, etc. The spring device 180 is tunable by changing its geometry length, width, material thickness, and shape and is a simple structure to manufacture. The spring device 180 provides elastic reaction and storage of internal energies during an impact with a lower leg of a pedestrian, which lengthens the time of contact between the push bar 162 and the lower leg of the pedestrian, in turn, lowering the peak forces applied to the leg. The spring device 180 uses a high strength spring steel to "store" energy temporarily during the impact event instead of relying on permanent material deformation to dissipate energy.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A bumper system for a motor vehicle comprising:
   an energy absorber;
   a bumper beam connected to said energy absorber and connected to vehicle structure at a front end of the motor vehicle; and
   a push bar disposed below and operatively connected to said bumper beam to deflect and rotate during an impact with an object by said bumper system.

2. A bumper system as set forth in claim 1 wherein said bumper beam is made of a metal material.

3. A bumper system as set forth in claim 1 wherein said push bar has a push bar member extending laterally.

4. A bumper system as set forth in claim 3 wherein said push bar member includes at least one attachment portion extending outwardly therefrom.

5. A bumper system as set forth in claim 4 wherein said push bar includes at least one attachment device interconnecting said at least one attachment portion and either one of said bumper beam and the vehicle structure.

6. A bumper system as set forth in claim 5 wherein said at least one attachment device includes a housing attached to said bumper beam and the vehicle structure and a pin extending through said at least one attachment portion and said housing to allow said push bar member to rotate.

7. A bumper system as set forth in claim 3 including at least one spring to urge said push bar member forward.

8. A bumper system as set forth in claim 1 wherein said push bar is made of either one of a metal material and a composite material.

9. A bumper system as set forth in claim 1 wherein said energy absorber is made of a deformable material.

10. A bumper system for a motor vehicle comprising:

an energy absorber;

a bumper beam interconnecting said energy absorber and connected to vehicle structure at a front end of the motor vehicle;

a push bar disposed below and operatively connected to said bumper beam to deflect and rotate during an impact with an object by said bumper system; and said push bar comprising a push bar member made of a relatively rigid material for extending laterally across the front end of the motor vehicle.

11. A bumper system as set forth in claim 10 wherein said push bar includes at least one attachment portion extending outwardly therefrom from said push bar member.

12. A bumper system as set forth in claim 11 wherein said push bar includes at least one attachment device interconnecting said at least one attachment portion and either one of said bumper beam and the vehicle structure.

* * * * *